UNITED STATES PATENT OFFICE.

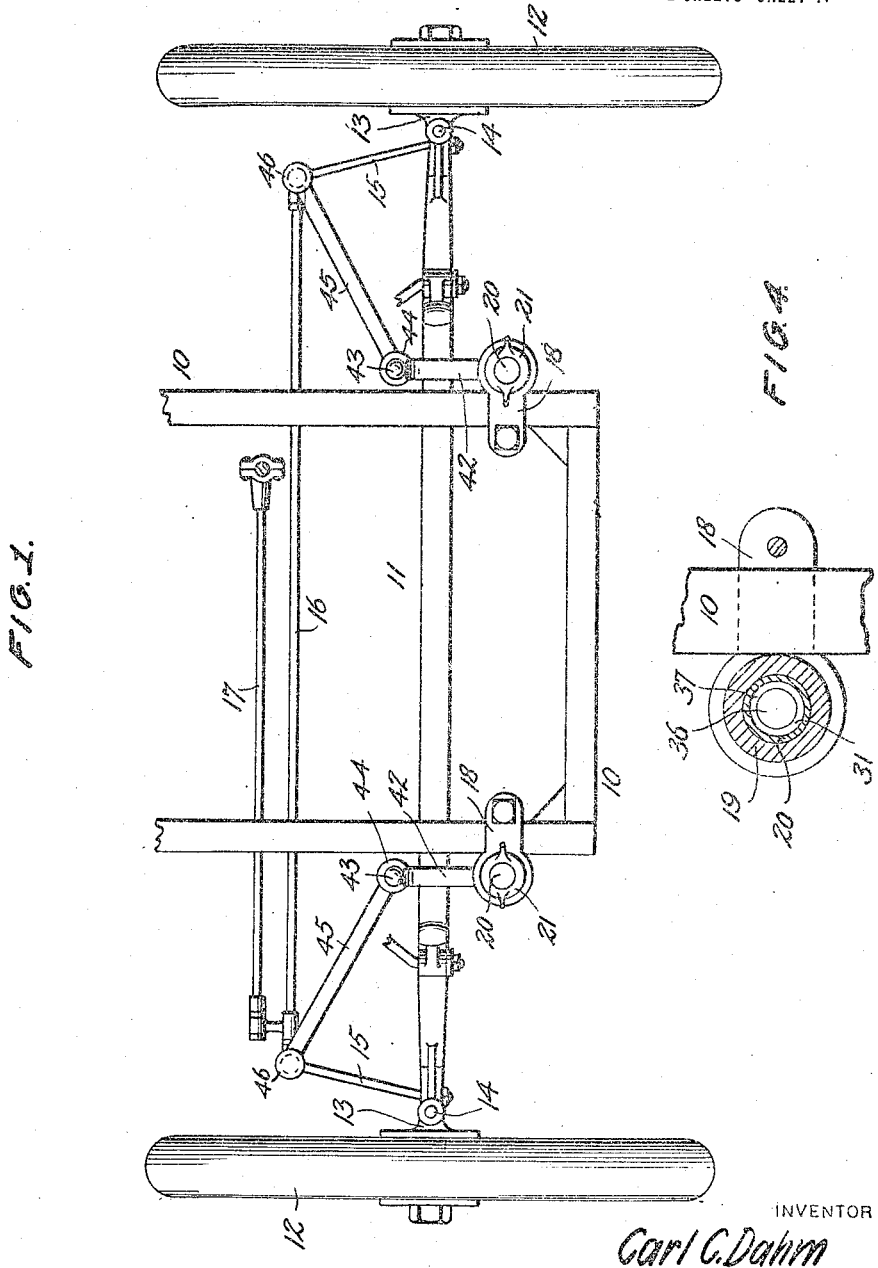

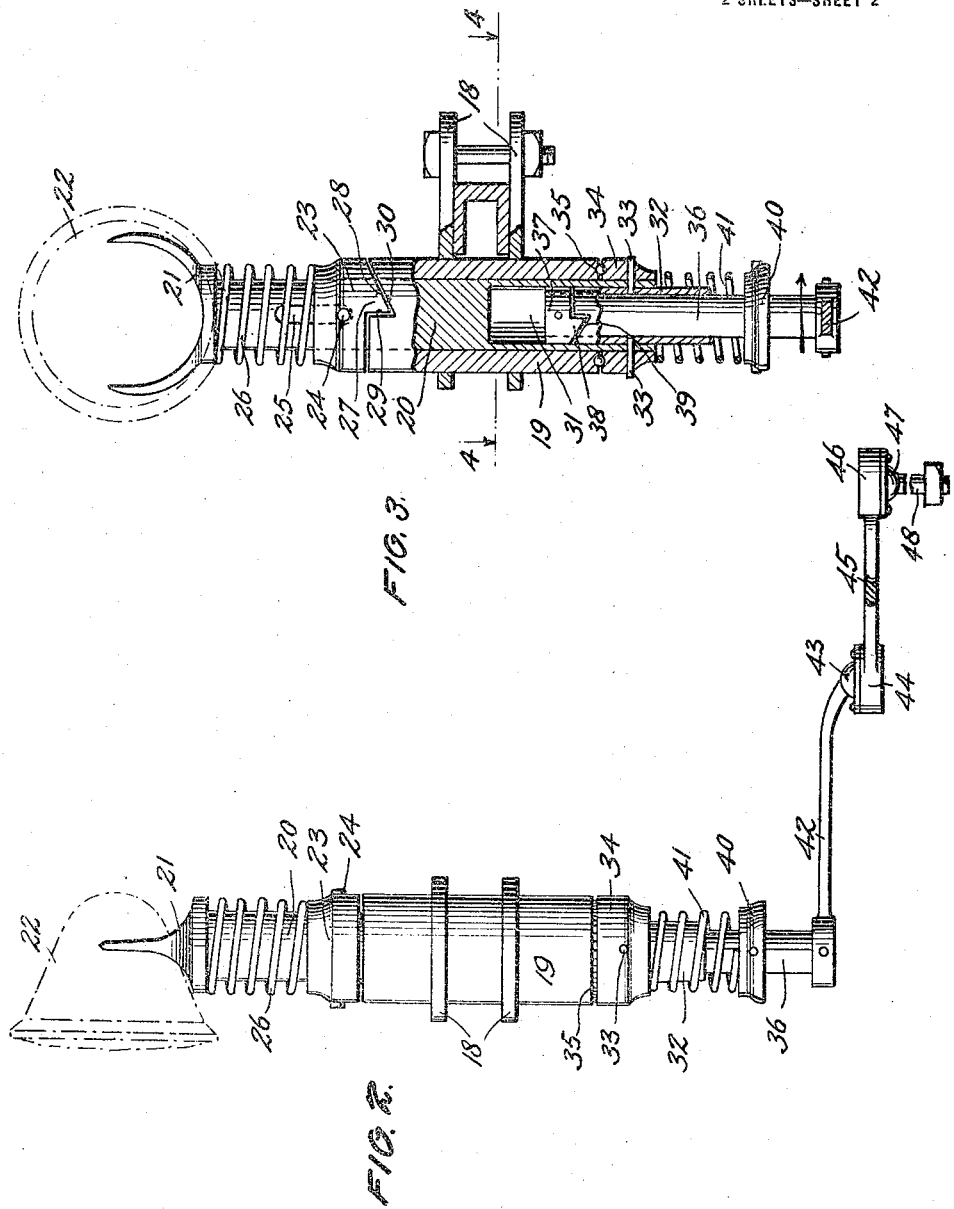

CARL C. DAHM, OF SASKATOON, SASKATCHEWAN, CANADA.

DIRIGIBLE HEADLIGHT.

1,286,950. Specification of Letters Patent. Patented Dec. 10, 1918.

Application filed November 7, 1917. Serial No. 200,794.

*To all whom it may concern:*

Be it known that I, CARL C. DAHM, a subject of the King of Denmark, residing at Saskatoon, in the Province of Saskatchewan and Dominion of Canada, have invented certain new and useful Improvements in Dirigible Headlights, of which the following is a specification.

This invention relates to dirigible head lights for vehicles and particularly to an adjustable bracket for supporting automobile head lights and means for operating said brackets, and has for its primary object to provide means for automatically turning one of the head lights in the direction in which the vehicle is turned, the other headlight in the meantime retaining its position of throwing the light directly ahead of the vehicle, an arrangement by which the roadway ahead of the vehicle is brilliantly illuminated, both in front of the vehicle and to the side thereof toward which the vehicle is turning, and furthermore, indicating to travelers, in front of the vehicle the direction in which the turn is to be made by the angular divergence of the rays of light from the lantern on the side of the vehicle toward which the vehicle is turning.

With the above as the principal objects in view, the invention consists in the novel construction, combination and arrangement of parts hereinafter described, pointed out in the appended claims and illustrated in the accompanying drawings, in which, Figure 1 is a top plan view of the front portion of an automobile frame with the head lights in position thereon and the connections therefrom to the steering mechanism of the vehicle.

Fig. 2 is a side elevation of the left head light bracket as viewed from the left side of the wheel, Fig. 3 is a rear elevation partly in section of the same head light bracket, and Fig. 4 is a horizontal cross sectional view on the line 4—4 of Fig. 3.

In the drawings, 10 indicates a portion of the frame of an automobile, 11 the front axle and 12 the front wheels, the latter being mounted as usual on brackets 13 connected by vertical pivots 14 to the ends of the front axle. Arms 15 extend rearwardly from the brackets 13 and are joined at their ends by the usual cross bar 16 for causing the wheels 12 to turn in unison when the steering wheel within the car is turned by the driver, a link rod 17 being connected to the lower part of the steering post and to the rod 16 in the well known manner.

Bolted to the frame 10 on each side thereof and at the front are brackets 18, said brackets being connected in any convenient manner, and each rigidly supports preferably on the outer side of the frame 10, a vertical sleeve 19 that forms a bearing for an upright stem 20 which extends through said sleeve and is provided on its upper end at a suitable distance above the sleeve with a yoke 21 that carries the head light 22. Slidable on the stem 20 above the sleeve 19 is a collar 23 maintained in place by a pin 24 that passes through the collar and through a longitudinal slot 25 in the stem 20, thus permitting the collar to move longitudinally on the stem but to rotate with the stem when the latter is turned. Between the top of the collar 23 and the under side of the yoke 21 is a coiled spring 26 by means of which the collar is maintained in sliding contact with the top of the sleeve 19. Projecting downwardly from the under side of the collar 23 at one side thereof is a tooth 27 having an inclined lower edge 28 and a vertical side 29, said tooth in the normal position of the head light, that is to say, when throwing the rays directly ahead is fitted within a depression 30 in the top of the sleeve 19 of similar shape to that of the tooth 27.

Projecting upwardly into the stem 20 from the bottom thereof is a socket 31 within which is fitted a short tubular member 32 that extends about half-way the length of the socket and projects a short distance below the lower end of the sleeve 20. This member is fixed to the stem 20 by pins 33 that project through the stem and the member and also through a collar 34 mounted on the lower end of the stem between the upper surface of which and the under surface of the sleeve 19 are antifriction bearings 35. From this it will be seen that any movement of rotation imparted to the member 32 will through the pin connections 33 turn the stem 20 and also the collar 34.

Slidable longitudinally and also rotatably within the tubular member 32 is a stout pin 36 the upper end of which projects above the top of the tubular member and has secured thereto a clutch collar 37 from the lower end of which projects a tooth 38 of similar shape to the tooth 27 adapted to engage a depression 39 in the top of the tubular member 32. Fastened on the pin 36, a short distance below the lower end of the tubular member 32, is a collar 40 between which collar and the bearing collar 34 on the bottom of the stem 20 is placed a spiral spring 41 that encircles the tubular member and the pin 36 as shown, and tends to hold said pin and clutch collar 37 downwardly, the latter in contact with the top of the tubular member and the tooth 38 fitted within the depression 39.

On the bottom of the pin 36 is affixed an arm 42 that extends rearwardly for a suitable distance and terminates in a ball 43, seated in a socket 44 on one end of a link 45, the opposite end of which link is provided with a similar socket 46 to receive a ball-shaped head 47 on the upper end of a pin 48 by means of which the arm 15 of the steering bracket 13 is pivoted to the connecting rod 16.

Constructed as described, when the automobile is steered so as to turn to the left, the left head light shown in Fig. 3 will be the one to turn in the same direction, because the pin 36 moved by the arm 42 in the direction indicated by the arrow will turn the clutch collar 37 in the same direction, thus causing the vertical face of the tooth 38 to engage the similar face of the depression 39 and turn the tubular member 32, the stem 20 and the head light yoke 21 in the same direction, throwing the rays of light from the head light to the left. The collar 23 bearing upon the top of the sleeve 19 will also turn with the stem 20 but owing to the fact that the position of the tooth 27 is the reverse of the tooth 38, the inclined surface 28 of the tooth and of the seat 30 will slide upon each other and force the collar 23 upwardly, compressing the spring 26.

The head light support on the right of the machine is similarly constructed to that on the left which has been described, the only difference being the reverse arrangement of the teeth 27 and 38 so that movement of the pin 36 at the right of the vehicle in unison with the one at the left will through the coöperation of the inclined surfaces of the tooth 38 and its seat 39, cause the pin to move vertically in its socket 31, the stem being prevented from turning through frictional contact of these surfaces by engagement of the vertical surface of the tooth and its socket 30.

After the vehicle has completed its turn and the steering wheel moved to return the vehicle to a straight position, said movement will cause the stems 36 of the two head light supports, to return to the position indicated in Fig. 3, restoring the left head light to its normal position shown.

What is claimed is:

1. A dirigible head light support comprising a fixed standard adapted to be secured to a vehicle, a vertical stem rotatable in said standard and adapted to support a lantern, means slidable longitudinally on said stem to prevent rotation of the stem in one direction, a pin slidable in the lower end of the stem adapted to be oscillated simultaneously with the steering mechanism of the vehicle to which the support is attached, and means between said pin and said stem for turning the latter only upon movement of the steering mechanism to turn the vehicle in one direction.

2. A dirigible head light support comprising a standard adapted to be secured to a vehicle, a vertical stem rotatable therein and provided with means at its upper end to support a lamp, a collar rotatable with said stem and slidable thereon adapted to lock with said standard and prevent rotation of the stem in one direction, but permit rotation in the opposite direction, a pin slidable longitudinally in the lower end of said stem, means connecting said pin with the steering mechanism of the vehicle for oscillating the pin, and locking means between said pin and said stem for causing rotation of the stem when the pin is turned in one direction but disengaged therefrom when turned in the opposite direction.

3. A dirigible head light support for vehicle comprising a standard adapted to be rigidly secured to a vehicle, a vertical stem rotatable in said standard and projecting above the same, means on the upper end of said stem for the attachment of a lamp, a collar rotatable with said stem and slidable longitudinally thereon, said collar having a depending tooth to engage a depression in said standard and permitting rotation of said stem in one direction from the normal position and locking it against rotation in the opposite direction, a pin slidable longitudinally in the lower end of said stem, means for connecting said pin to the steering mechanism of the vehicle, a collar on the upper end of said pin having a depending tooth to engage a depression in said stem for rotating said stem when the pin is turned in one direction only from the normal.

4. A dirigible head light support for vehicles comprising a standard adapted to be secured to a vehicle, a vertical stem rotatable in said standard and provided on its upper end with means for supporting a lantern, a collar rotatable with said stem but slidable longitudinally thereon, resilient means holding said collar against the upper end of the stem, a tooth having a locking side and an inclined side engageable with a depression in the upper end of said standard and permitting rotation of the stem when turned in one direction from the normal but locking against rotation in the opposite direction, a tubular member fitted within a socket in the lower end of said stem, a pin slidable vertically within said tubular member and socket, means connecting the pin with the steering mechanism of the vehicle, a collar on the upper end of said pin having a depending tooth with a locking side and an inclined side reversely arranged to the first-named tooth and engageable in a depression of similar shape in the upper end of said tubular member, an arrangement whereby rotation of the lamp is permitted in one direction only from the normal position of said lamp.

5. A dirigible head light support for vehicles comprising a vertical standard adapted to be secured to the vehicle, a stem projecting upwardly through said standard and rotatable therein, said stem having means on its upper end for supporting a lamp, a collar rotatable with said stem but slidable longitudinally thereon, a spring surrounding said stem and adapted to press upon said collar to hold the latter against the upper surface of the standard, a tooth depending from the under side of said collar having a vertical face and an inclined face fitting a depression of similar shape in the upper end of said standard whereby said stem is permitted to rotate in one direction only from its normal position, a tubular member secured within a socket in the lower end of said stem, a pin projecting through said tubular member and into said socket and adapted to move longitudinally therein, means connecting said pin with the steering mechanism of the vehicle, a collar secured to the upper end of said pin, a tooth on the under side of said collar having a vertical face and an inclined face oppositely disposed to the first mentioned tooth and fitting a depression of like shape in the upper end of said tubular member, and a spring normally pressing downwardly on said pin to maintain engagement of the tooth thereon with its coöperating socket.

In testimony whereof I affix my signature in presence of two witnesses.

CARL C. DAHM.

Witnesses:
J. M. CHRISTENSEN,
W. ROBINSON.

Copies of this patent may be obtained for five cents each, by addressing the "Commissioner of Patents, Washington, D. C."